Figure 1:
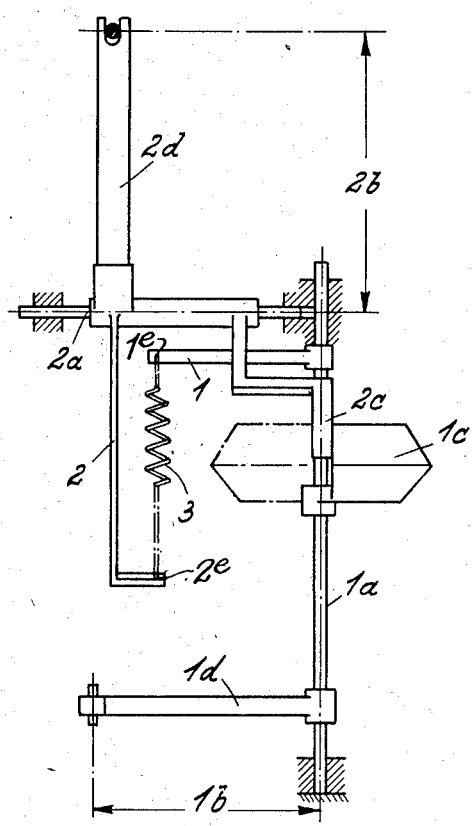

June 5, 1934. F. VON SCHÜTZ 1,962,044
DRY GAS METER
Filed April 8, 1930 5 Sheets-Sheet 1

F. Von Schutz
INVENTOR

By Marks Clerk
Attys.

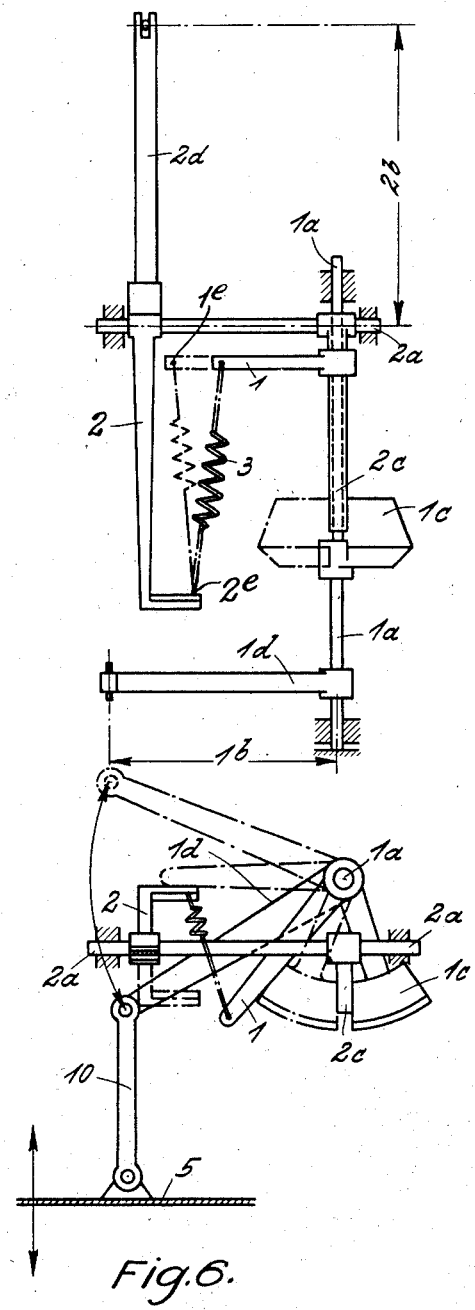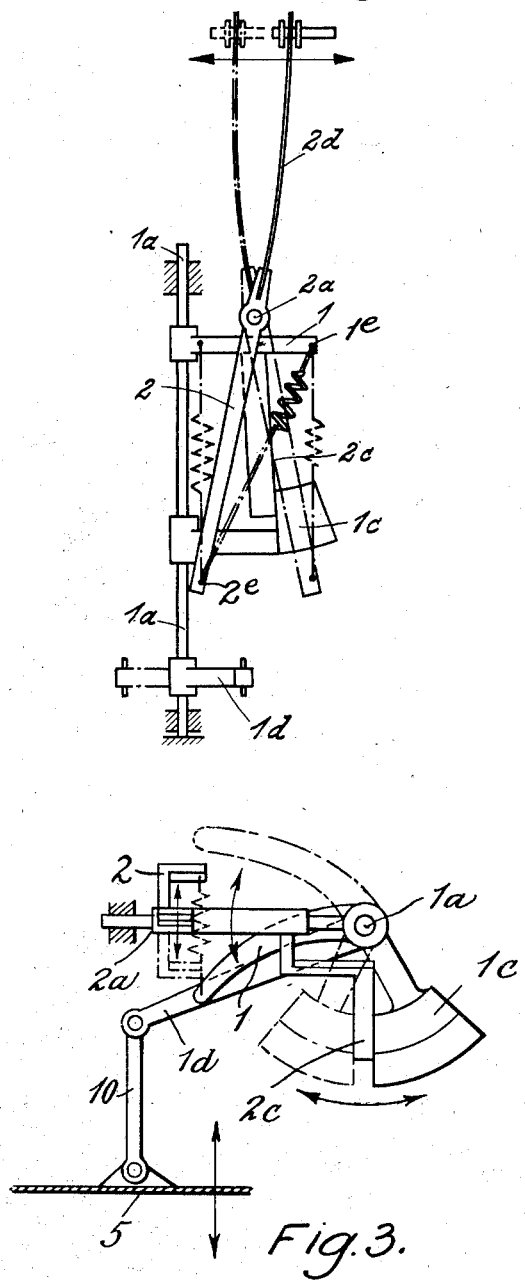

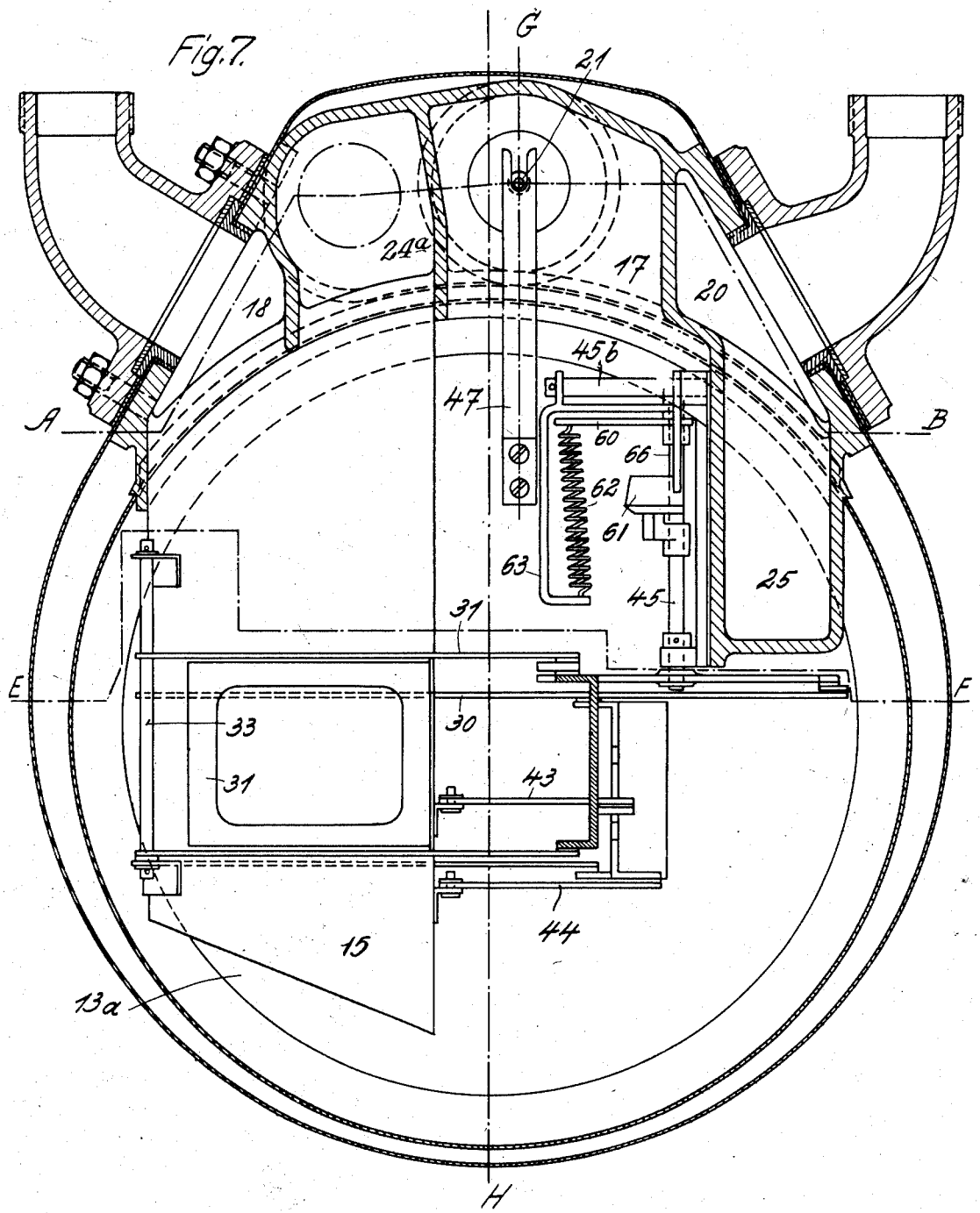

June 5, 1934.  F. VON SCHÜTZ  1,962,044

DRY GAS METER

Filed April 8, 1930   5 Sheets-Sheet 4

F. Von Schütz
INVENTOR

By: Marks & Clerk
ATTYS.

June 5, 1934.  F. VON SCHÜTZ  1,962,044
DRY GAS METER
Filed April 8, 1930    5 Sheets-Sheet 5

F. Von Schutz
INVENTOR

By Marks Klein
Attys.

Patented June 5, 1934

1,962,044

UNITED STATES PATENT OFFICE 1,962,044

DRY GAS METER

Friedrich von Schütz, Berlin, Germany

Application April 8, 1930, Serial No. 442,633
In Germany April 8, 1929

2 Claims. (Cl. 73—1)

This invention relates to dry gas meters, and more particularly to a reversing mechanism for the valves thereof.

Reversing mechanisms for gas meters furnished with two measuring chambers consist generally of a guide lever controlled by the to and fro movement of the diaphragm and of a lever acted upon by a tension spring, the said second lever being reversed with sudden movement at the end of each stroke of the diaphragm. During the movement of the diaphragm and of the guide lever, connected to it, the said second lever, which will be termed the tilting lever, rests by means of an abutment furnished with a snap member against a corresponding snap member connected to the guide lever. The spring becomes tensioned during the course of the movement and the sudden reversal is performed by means thereof at the end of the movement.

It is the primary object of this invention to improve on reversing mechanisms of the kind referred to.

The objects and advantages of the invention will become apparent as the description proceeds.

In the known embodiments of reversing mechanisms usually applied to dry gas meters the axes of the guide lever and of the tilting lever are arranged parallel. The employment of reversing mechanisms of this kind in some cases is rather difficult as the total construction of the gas meter depends for the greater part on the reversing mechanism, as will be seen by the following.

In order to obtain the greatest exactitude in the reversal and also to avoid sharp angles at the edges of the snap members, it is necessary for the snap members to rest on each other at right angles. The space, however, then assumed by the snap members exerts unfavourable influence on the depth of construction of the gas meter. As, besides this, the distances between the point of engagement of the diaphragm and the axis of the guide lever, between the axis of the tilting lever and the valve spindle and between these two axes have to lie in this construction in one line and cannot be reduced optionally, the necessity arises in designing mechanisms of this kind to adapt from the very commencement the position of the valve spindle to the reversing mechanism and to frequently renounce advantages in the utilization of space which might be available assuming such necessity did not exist.

By the arrangement of the two axes referred to according to the invention this disadvantage is overcome and greater freedom is obtained as regards the position of the driving and driven points in relation to each other and to the reversing mechanism. The object of this invention is to dispose the one axis so as to be at right angles or approximately right angles to the other axis.

The invention will now be described with reference to the accompanying drawings, in which:—

Figure 2:
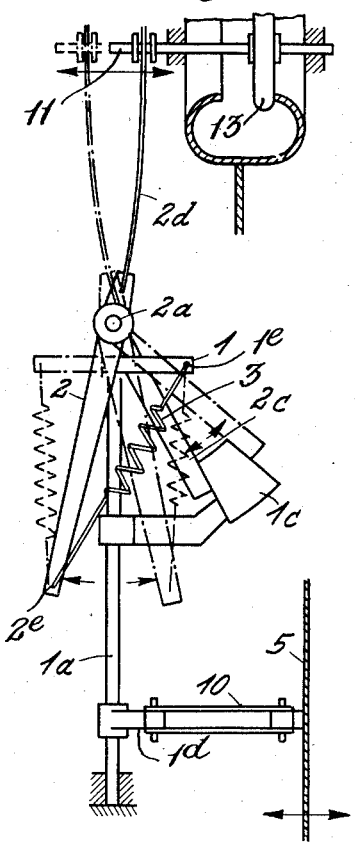
Figure 8:
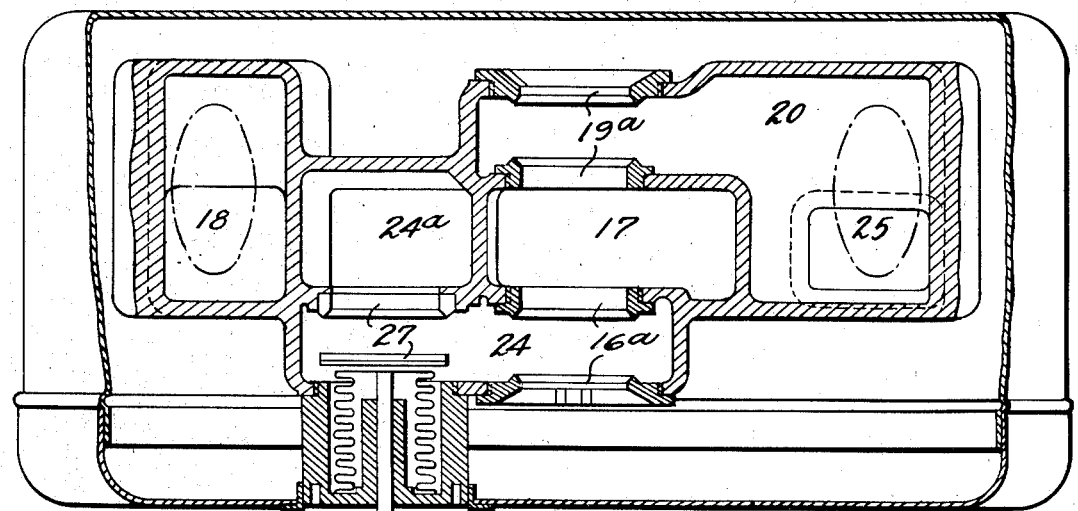
Figure 9:
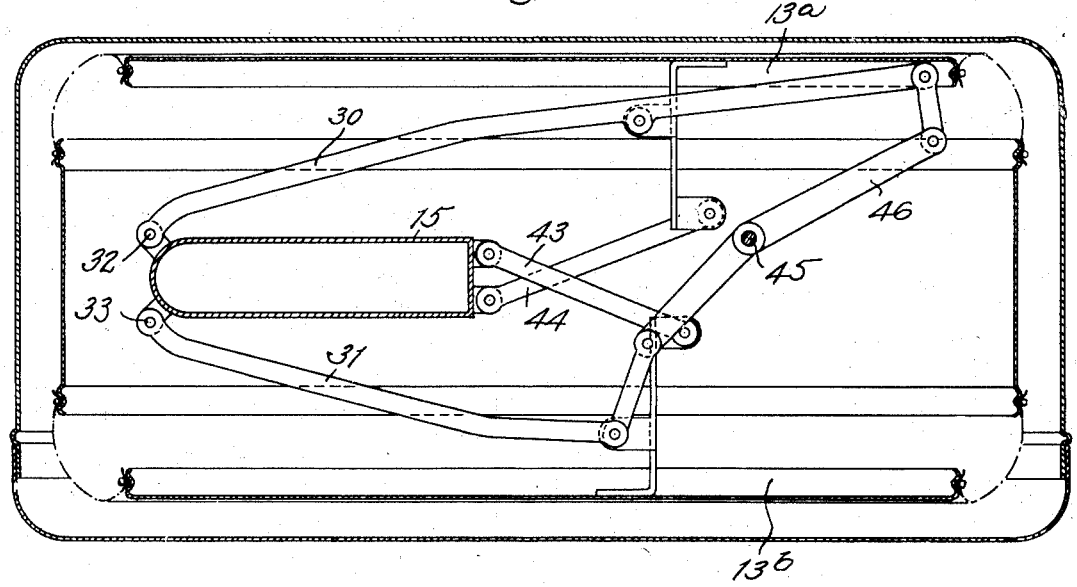
Figure 10:
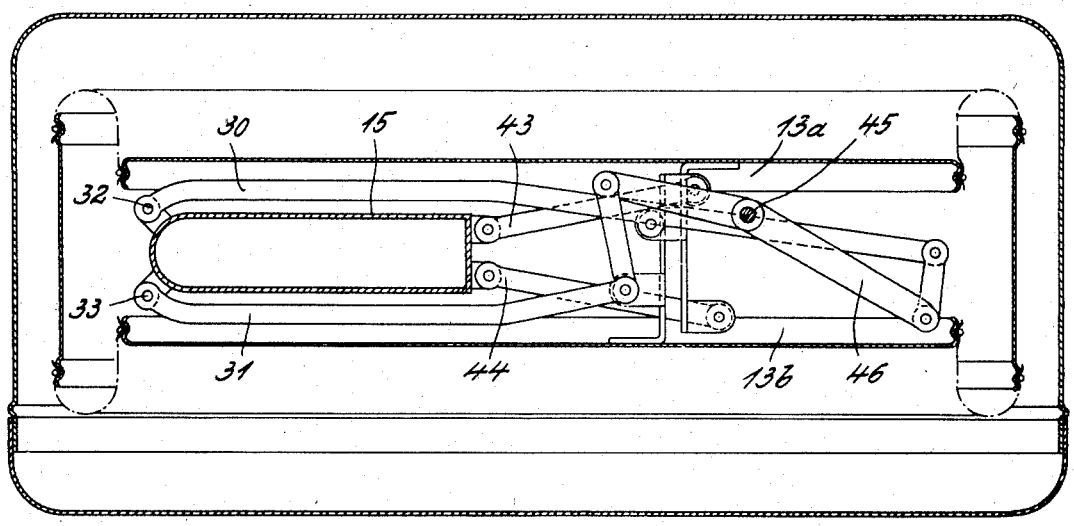
Figure 11:
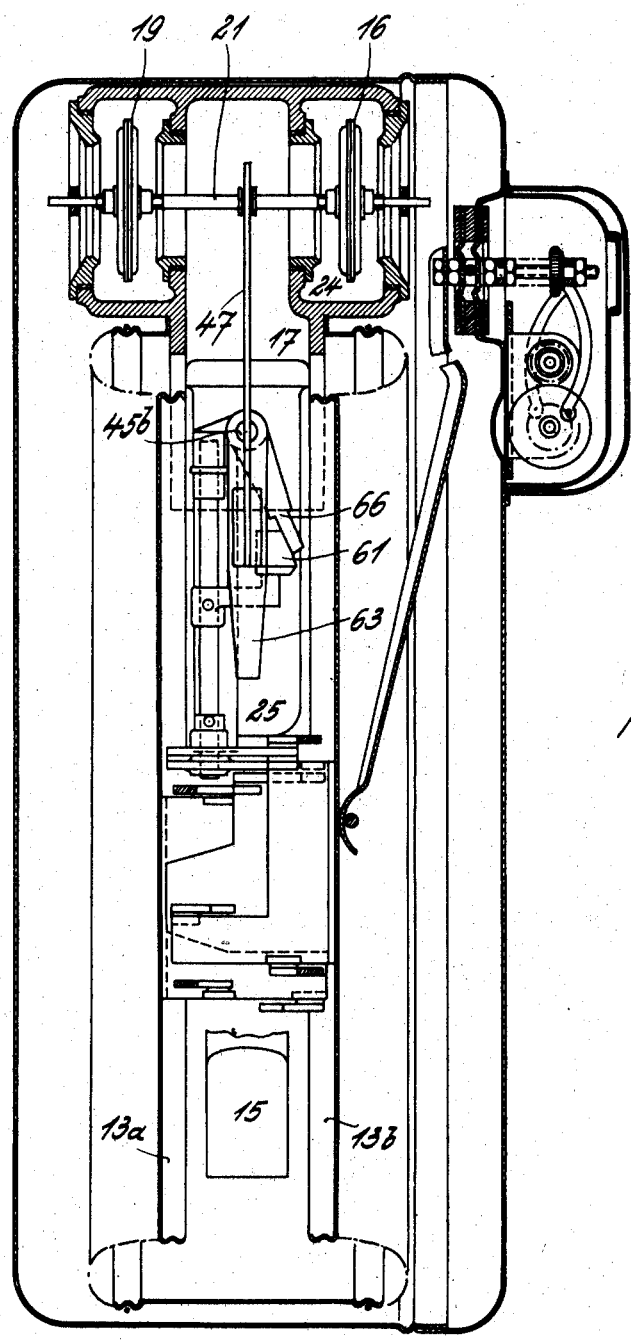

Figure 1 shows an embodiment of the reversing mechanism according to this invention in elevational view, Figure 2 being a side view and Figure 3 a plan view thereof, Figure 4 is a modification of this reversing mechanism in elevational view, Figure 5 being a side view and Figure 6 a plan view of this modification, Figure 7 is a sectional view of a gas meter provided with a reversing mechanism according to this invention, Figure 8 is a cross section along A—B of Fig. 7, Figures 9 and 10 are cross sections along E—F of Fig. 7 showing the two end positions of the diaphragms and their guidance, Figure 11 is a cross section along G—H of Fig. 7.

In Figs. 1 to 3 the to and fro going diaphragm plate 5 imparts to shaft 1a a turning movement by means of the link 10 and the coupling lever 1d which is connected rigidly to the shaft 1a. The shaft 2a carries a tilting lever 2 to which a resilient member 2d, for example a leaf spring, is fastened which member controls the spindle 11 of the valve 13. Rigidly connected to the shaft 1a is the guide lever 1. The guide lever 1 and the tilting lever 2 are connected by the spring 3 fastened to point 1e of guide lever 1 and to point 2e of guide lever 2. The shaft 1a carries the snap member 1c cooperating with the snap member 2c connected to the shaft 2a. The mechanism is shown in the position just prior to the snapping action of the tilting lever. The snap member 1c just releases the snap member 2c and the tilting lever 2 swings into the opposite position, indicated by dotted lines through the medium of the spring 3 which has been tensioned during the foregoing movement of the diaphragm. Hereby the valve 13 is reversed, the gas flows in an opposite direction and therefore the diaphragm plate 5 moves the lever 1 to the position shown by dotted lines, whereby the spring 3 is stretched again. During the movement of the levers 1d and 1 connected rigidly to the shaft 1a, the shaft 2a and the lever 2 connected to it are held at the snap face 2c in their position by the snap face 1c. As soon as the movement of the diaphragm is completed the lever 2 wings again into its opposite position.

As is to be seen from the drawings, the axes of the shaft 1a of the guide lever 1 and of the shaft 2a of the tilting lever 2 are arranged to be at right angles to each other. With this arrangement there certainly still exists as in the devices hitherto known the condition that the axis 1a is arranged at a distance 1b, equalling the length of the lever 1d from the point of engagement of the diaphragm, and the axis 2a at a distance 2b equalling the length of 2d from the valve spindle, whereby these distances 1b and 2b, or in other words the lengths of the levers, are in the manner described dependent on the angular movements performed by the guide lever and by the tilting lever and on the strokes of the diaphragm and the valve. With quite a different effect however, than hitherto the operating lever 1d may be displaced as desired along the axis 1a, and the operating lever 2d in the form of the leaf spring as desired along the axis 2a, the two axes 1a and 2a being at right angles to each other.

This capability of displacing the levers 1d and 2d along their axes which are at right angles to each other obviously greatly increases the freedom in construction.

In the first place it is possible to select the distance between the driving and the driven points, i. e. the diaphragm and the valve, independently of the lengths of the levers 1d and 2d and of the other dimensions and angular movements of the reversing mechanism, which is impossible with the hitherto known arrangement, in which 1a and 2a were disposed parallel to each other.

Secondly in an arrangement according to this invention the axes 1a and 2a do not necessarily require to lie in one plane. If, for example, the axis 2a requires to be arranged in the central plane of the measuring chamber, the axis 1a, in order to avoid too far a lateral projecting of the snap members 1c and 2c in the direction of movement of the diaphragm plate 5, may, as shown in Figs. 4 to 6 be disposed sideways. The path along which the suspension point 1e of the tension spring 3 is guided by the lever 1 certainly thus becomes unsymmetrical and involves an inclined position of the spring in the extreme position, which however, if suitably selected, will in no way affect the movement of the reversing mechanism.

A third advantage of arranging the axes 1a and 2a at right angles consists in the possibility, without the assistance of additional coupling links, of even performing the transmission of such movements the directions of which are not lying in one plane. If, for example, the lever 1d is mounted on its axis 1a not in accordance with Figs. 4 to 6, but vertically to the position shown therein i. e. vertically to the plane of drawing of Figure 4, the movement of the valve spindle 11 is converted into a direction which is vertical to the movement of the diaphragm plate 5.

A possible form of use of the invention is illustrated in Figs. 7 to 11. The gas meter therein shown, which will be understood as cited merely by way of example, possesses two oppositely moved diaphragms 13a and 13b which are guided in parallel fashion by means of oscillatory frames 30 and 31 with the pivots 32 and 33 and by means of guide levers 43 and 44.

The peculiarity of this embodiment consists in the fact that the valves are provided outside of the measuring chambers, that the space available for the reversing mechanism is limited and transmission by means of a control mechanism having parallel axes would be confronted by difficulties. At the upper part of the gas meter there is provided a casting which contains the valve chambers 20 and 24, guide passages 17, 18 and 24a, and flanges for the connection pieces to the gas piping. The gas passes through the connection piece into the chamber 18 and from here to a sheet metal chamber 15 in which dust and dirt settle and through the chambers 24a and 24 to the inlet valve 16 with the seatings 16a. The valve 27 shown in the drawing is a detachable valve operated by mechanism controlled by a coin. The chamber 17 communicates with the space between the diaphragms. The outlet valve 19 with the seatings 19a leads to the chambers 20 and to the outlet connection piece. The valves 16 and 19 are mounted on a common spindle 21 which on a double collar provided for this purpose is reversed by means of the leaf spring 47. This spring is secured to a lever 63 oscillating round the pivot 45b. The movement of the diaphragm is transmitted by means of a double lever 46 to a vertical shaft 45, to the lever arm 60 to which is secured the spring 62. The other end of the spring is fastened to lever 63. To shaft 45 the abutment carrying the snap member 61 is connected rigidly lever 63 being controlled by the snap member 66, connected to it rigidly and engaging with the snap face 61.

The position of the spindle 21 and of the points of engagement of the lever 46 with the supporting frames 30 and 31 have no influence on the construction of the reversing mechanism, since the double lever 46 and the leaf spring 47 may be given suitable lengths quite independently of each other, so as to obtain the most favorable angular movement of the levers 60 and 63 and the most favorable shape of the snap members 61 and 66.

It will be understood that no restriction is made to the particular embodiment shown and that various modifications are quite possible within the meaning of the above description and the appended claims without departing from the spirit of the invention.

What is claimed is:

1. A gas meter comprising a measuring chamber having a diaphragm, valves controlling the flow of gas to and from said measuring chamber, said valves having a spindle; a coupling lever controlled by the movement of the diaphragm, means including a shaft oscillated by this coupling lever, an arm on said shaft and having an abutment, a second shaft disposed with its axis substantially at right angles to the axis of the first named shaft, an arm on said second shaft and having an abutment cooperating with the abutment first named, a spring, each of said shafts having an arm connected to one end of said spring respectively, and means connecting said second shaft to said spindle, said abutments and the arms last named cooperating so that during a part of the movement of the diaphragm, the spring is tensioned and at the end of the diaphragm movement, the abutments permit the tensioned spring to shift the valves.

2. A gas meter comprising a measuring chamber having a diaphragm, valves controlling the flow of gas to and from said measuring chamber, said valves having a spindle; a coupling lever controlled by the movement of the diaphragm, means including a shaft oscillated by this coupling lever, an arm on said shaft and having an abutment, a second shaft disposed with its axis substantially at right angles to the axis of the first named shaft, the two axes not intersecting each other, an arm on said second shaft and having an abutment cooperating with the abutment first named, a spring, each of said shafts having an arm connected to one end of said spring respectively, and means connecting said second shaft to said spindle, said abutments and the arms last named cooperating so that during a part of the movement of the diaphragm, the spring is tensioned and at the end of the diaphragm movement, the abutments permit the tensioned spring to shift the valves.

FRIEDRICH von SCHÜTZ.